Figure 1:
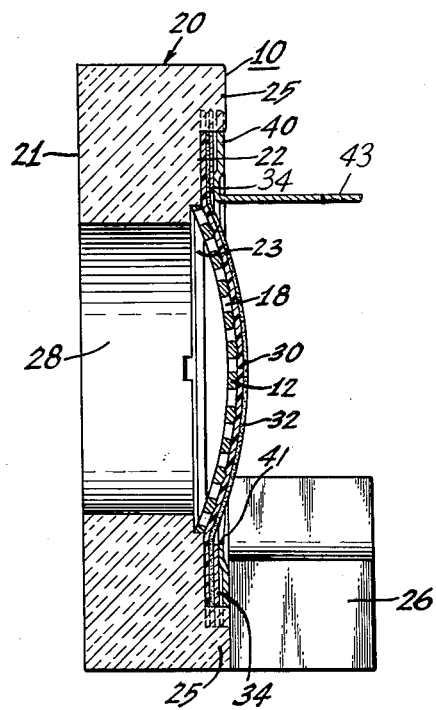

June 26, 1962     A. G. LAZZERY     3,041,418
TRANSDUCERS
Filed Jan. 14, 1960

INVENTOR.
ANGELO GINO LAZZERY
BY
ATTORNEY

United States Patent Office 3,041,418
Patented June 26, 1962

3,041,418
TRANSDUCERS
Angelo Gino Lazzery, Oaklyn, N.J., assignor to Radio Corporation of America, a corporation of Delaware
Filed Jan. 14, 1960, Ser. No. 2,444
8 Claims. (Cl. 179—111)

This invention relates to transducers, and more particularly to electroacoustical transducers of improved sensitivity.

In certain condenser type transducers used to transform electrical energy to acoustical energy and the reverse, there is provided a thin, vibratory diaphragm with a coating of conductive material on one surface thereof, the coated diaphragm being stretched to a tension which will give it a high natural vibratory frequency. The conductive coating on the surface of the diaphragm forms one plate of a condenser, the other plate being formed by a rigid body spaced a small distance from the vibratory diaphragm. In order to obtain high efficiency and fidelity of response, the spacing between the plates must be as small as practicable in proportion to the vibratory excursions of the diaphragm. As a practical matter, conventional condenser transducers which utilize a dielectric diaphragm between their plates have a low sensitivity due to the fact that bowing takes place which varies the distance between the plates in a non-uniform manner. It is therefore important to the efficiency of the device that bowing be prevented or compensated for, and that the distance between the plates be kept uniform. It has also been found that, when certain types of tensioning members are used to stretch some types of diaphragms, and a voltage is applied across the plates of the condenser, there is a migration of the conductive coating of the diaphragm to the tensioning member which decreases the lifespan of the transducer due to the depletion of the conductive coating. Another problem encountered with condenser type transducers is that, as the temperature of the surrounding area changes, the diaphragm will expand or contract, and this, in turn, will affect the efficiency of the device by changing the distance between the plates of the condenser.

It is therefore the primary object of this invention to provide an improved electrostatic transducer which will be free from the aforementioned difficulties.

It is another object of this invention to provide an improved electrostatic transducer in which a uniform distance between the plates of the condenser will be maintained at all times.

It is still a further object of this invention to provide an improved electrostatic transducer which has thermal stability.

It is still a further object of this invention to provide an improved electrostatic transducer in which shorting of the condenser due to contact between the plates is prevented.

It is still another object of this invention to provide an improved electrostatic transducer in which migration of the atoms of the plates to other surfaces is prevented, thereby increasing the life of the transducer.

It is still a further object of this invention to provide an improved electrostatic transducer as aforesaid which is simple and economical to manufacture, and which is highly efficient in use.

In accordance with this invention, a condenser type transducer is provided which, while by no means limited to such use, finds special usefulness as a sonic transducer in remote control devices for television receivers. The transducer contains two plates, one of which is a rigid, curved grid which contains a plurality of holes, the holes being tapered outwardly in a direction through the grid from one surface of the curved plate to the other surface thereof. A dielectric vibratory diaphragm is positioned over the side of the grid surface at which the larger ends of the openings terminate, and a coat of conductive material is formed on the diaphragm to form the other plate of the condenser. A resilient member secures the diaphragm against the curved plate, thereby insuring equal distance at all points between the diaphragm and the curved plate when the diaphragm is vibrating. When the transducer is acting to translate electrical energy into sonic energy, a varying voltage is applied across the plates of the capacitor which causes the tensioned diaphragm to vibrate, thereby emitting sonic waves. The crown of the grill, in combination with the pressure of the resilient member, keeps the diaphragm taut so as to produce an efficient transformation of the electrical energy to sonic energy. A protective gasket can be placed between the second plate and the resilient member to prevent migration of the second plate atoms to the resilient member. When the transducer operates as a microphone to translate sonic energy into electrical energy, sonic waves are picked up by the microphone and the diaphragm is caused to vibrate and thereby vary the capacitance between the plates. In this way, the sonic energy is converted into electrical energy which can, in turn, be used to perform certain functions. For example, the electrical output of the transducer can be used to actuate a relay which will, in turn, energize a motor-operated television receiver tuner to thereby change television channels. When the transducer is to be used as a microphone, a polarizing voltage is preferably applied across the plates which will force the diaphragm into close contact with the curved plate. In fact, the thin diaphragm is thereby forced down into the larger ends of the holes in the curved, grid-like plate to form, in effect, a plurality of individual capacitor units in the areas around each hole, thereby providing a highly sensitive microphone.

Figure 3:
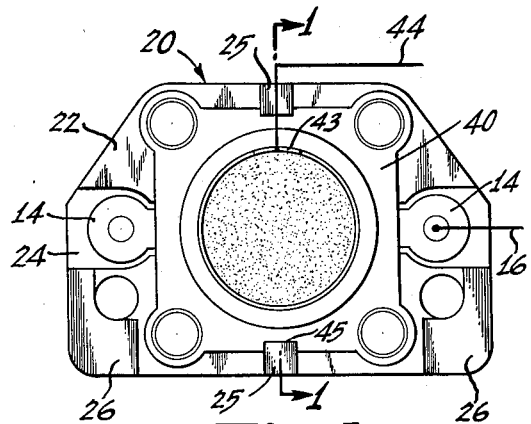
Figure 2:
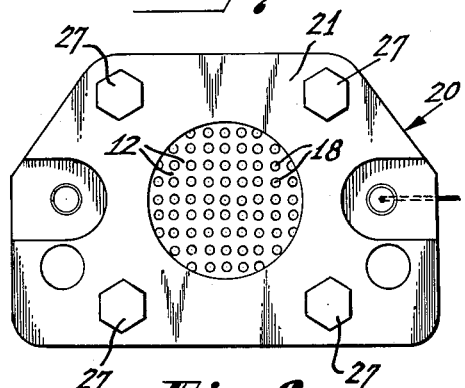
Figure 4:
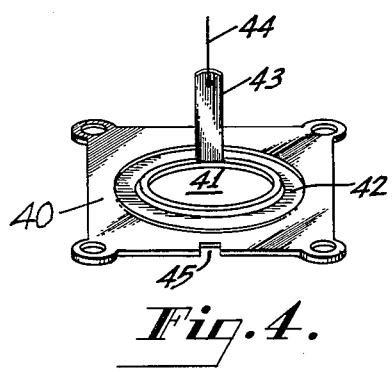
Figure 5:
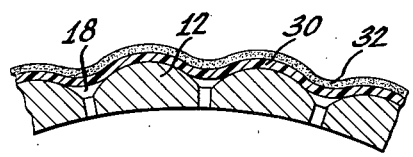

The novel features of this invention, as well as additional objects and advantages thereof, will be understood more fully from the following description when read in connection with the accompanying drawings, in which:

FIG. 1 is a cross-sectional view of the transducer taken along line 1—1 of FIG. 3, FIG. 2 is a front elevational view of the transducer shown in FIG. 1, FIG. 3 is a rear elevational view of the transducer shown in FIG. 1, FIG. 4 is a perspective view of the resilient, vibratory member of the transducer shown in FIG. 1, and FIG. 5 is a somewhat enlarged, fragmentary, sectional view of an assembly of parts of the transducer shown in FIG. 1 with the diaphragm under vibratory tension.

Referring, now, more particularly to FIGURES 1 and 5 of the drawings, a condenser type transducer 10 is shown including a first plate 12 in the form of a rigid, crowned, perforated, circular member having opposed convex and concave surfaces and which may be composed of brass to which a bright nickel finish is applied. Any similar, rigid, conductive material can be used. Two opposed arms 14 are formed as an integral part of the circular member and extend outwardly in opposite directions from the periphery of the circular member, as shown in FIG. 3, each arm being formed with a hole in the outer end thereof. Soldered to the outer end of one of the arms is a first lead wire 16. The first plate 12 is formed with a plurality of holes 18, each hole being tapered outwardly in a direction from the concave surface thereof to the convex surface thereof adjacent the convex surface. The holes may be tapered to any desired degree and are preferably formed in vertical and horizontal alignment, as shown in FIG. 2. The first plate 12 is also crowned, as illustrated in FIG. 5, to a degree sufficient to insure intimate contact with the diaphragm to be hereinafter described, the degree to which it is crowned depending on the elasticity of the diaphragm material.

The first plate 12 is connected to a base 20, as shown in FIGS. 1 and 3, the base being formed in the shape of a many-sided, relatively thick wafer having a front surface 21 and a rear surface 22, and being formed, in the center thereof, with a circular hole 28 of somewhat smaller diameter than the above-described first plate 12. The base is formed of insulating material, such as Glaskyd No. 3001, manufactured by The Glaskyd Company, Inc., of Perrysburg, Ohio, or any material with like characteristics. In the rear surface 22 of the base 20 adjacent to the circumference of the hole 28 is an indentation 23 dimensioned to receive the periphery of the first plate 12 in a manner such that the convex surface of the plate substantially merges with the rear surface 22 of the base 20. This allows the hereinafter described diaphragm to extend over the entire convex surface of the first plate 12 and onto the rear surface 22 of the base and be secured thereto in such a manner that the spacing between the diaphragm and the first plate will be substantially the same at all points. The rear surface 22 of the base also has a depressed area 24 dimensioned to accommodate the arms 14 of the first plate 12 in order to allow the periphery of the plate to seat in the indentation 23, as explained above. Two projections 25, used to align a hereinafter described gasket and resilient member over the first plate 12, extend perpendicularly from the rear surface 22 of the base, the projections 25 being located next to the periphery of opposed sides of the base 20. The rear surface 22 of the base 20 is also constructed with a pair of leg-like members 26 used to mount the transducer in different types of devices. A plurality of holes 27 are formed in the base to receive bolts for connecting a spring-pressed member, to be hereinafter described, to the rear surface 22 of the base 20. The first plate is secured to the base by its arms 14.

Extending over the convex surface of the first plate 12, as shown in FIGS. 1 and 3, is a circular, vibratory diaphragm 30 of dielectric material. The diaphragm 30 may be composed, for example, of a polyester film, such as manufactured by the E. I. du Pont de Nemours Company, and sold under the trade-mark "Mylar." Any thin, vibratory, dielectric material could be used. The diameter of the diaphragm 30 is substantially larger than the diameter of the first plate 12 so that it completely covers the first plate and extends over the rear surface 22 of the base 20 in such a manner that it can be secured against the base by means of a back plate to be hereinafter described. The second plate 32 of the condenser 10 comprises a thin coat of conductive material, such as aluminum, uniformly applied over that surface of the diaphragm 30 which is remote from the convex surface of the first plate 12.

Positioned adjacent to the second plate 32 is a gasket member 34, as shown in FIG. 1, having a circular hole in the center thereof, the diameter of the hole being the same as that in the resilient member to be hereinafter described. Two opposed edges of the gasket member 34 are formed with grooves in the periphery thereof, the grooves being positioned to engage the projections 25 formed on the rear surface 22 of the base 20. The gasket 34 may be composed of the same material as the second plate 32 in order to prevent migration of the atoms of the second plate to the resilient member when a voltage is applied across the plates of the condenser.

Positioned next to the gasket 34 is a resilient member 40, as shown in FIGS. 1, 3 and 4 of the drawing, having a hole 41 in the center thereof, the diameter of the hole being greater than the diameter of the first plate 12. The resilient member 40 is preferably composed of a phosphor bronze material having a spring temper, the bronze being coated with a cadmium plate, and both materials having substantially the same thermal expansion as the base and diaphragm materials. The resilient member 40 is connected to the base 20 by bolts extending through holes in its surface, the resilient member 40 being positioned so that the circular hole 41 in the center thereof is in alignment with the rigid plate 12. Located adjacent to the circumference of the hole 41 on the side of the resilient member 40 engaging the gasket 34 is a ridge 42 securing the diaphragm 30 against the rear surface 22 of the base 20 and tensioning the diaphragm uniformly over the first plate 12. Projecting from the surface of the resilient member 40 opposite from the surface formed with the ridge 42 is a tab 43 to which is soldered a second lead wire 44. The resilient member 40 is also formed with grooves 45 along two of its opposed edges for engagement with the projections 25 extending from the rear surface of the base 20, such engagement positioning the hole 41 over the plates.

When operating the condenser type transducer 10 to convert electrical energy into sonic waves, a varying voltage of desired frequency is applied across the plates of the condenser to cause the tensioned diaphragm 30 to vibrate and thereby emit sonic waves of this desired frequency. In order to obtain an efficient conversion from one form of energy to another, it is desirable that the two plates of the condenser 10 shuold be spaced uniformly from each other at all points therebetween when the diaphragm 30 is vibrating. In order to accomplish this result, the transducer of the present invention is formed with a rigid plate 12 crowned in an amount sufficient to compensate for any bow in the diaphragm 30 when the latter is vibrating. The transducer is also constructed with the resilient member 40 which tensions the diaphragm 30 uniformly over the crowned, rigid plate 12, the uniform tension being maintained even during changes in temperature due to the fact that the materials of the diaphragm 30, and the base 20 and the resilient member 40 have the same thermal coefficient.

The transducer 10 may also be operated as a microphone for converting sonic energy to electrical energy, in which case it is preferable to apply a polarizing voltage across the plates in order to insure a more sensitive device by forcing the diaphragm 30 into intimate contact with the sides of the holes 18, as shown in FIG. 5. When the diaphragm 30 is then caused to vibrate by impressing sonic waves thereon, the area around each hole 18 becomes, in effect, an individual condenser, thereby providing a highly sensitive device.

From the foregoing description, it will be apparent that I have provided an improved electrostatic transducer which has increased efficiency over previously known transducers of the electrostatic type. While I have illustrated and described one particular form of transducer, it will, no doubt, be apparent to those skilled in the art, that various changes may be made in this particular form, and that other forms are possible, all within the spirit of the present invention. For example, the diaphragm of the transducer may be made of any vibratory dielectric material, the crown of the rigid plate being adjusted to compensate for the degree of bowing of the particular material. Hence, I desire that the foregoing shall be taken merely as illustrative and not in a limiting sense. What is claimed is:

1. An electrostatic transducer comprising two plates, a first of said plates comprising a rigid, curved, conductive member having opposed convex and concave surfaces and containing a plurality of holes, each said hole tapering outwardly in a direction from said concave surface to said convex surface of said first plate, a vibratory diaphragm of dielectric material extending over said convex surface of said first plate, the second of said plates comprising a coat of conductive material on the surface of said diaphragm which is remote from said convex surface, and a resilient member engaging said second plate and tensioning said diaphragm and said second plate uniformly over said first plate.

2. An electrostatic transducer as defined in claim 1 wherein said resilient member is formed with a circular hole in alignment with said plates, said hole having a larger diameter than that of said first plate.

3. An electrostatic transducer as defined in claim 2 wherein said resilient member is formed with a ridge adjacent to the circumference of said hole on the side of said resilient member adjacent to said second plate, said ridge engaging said second plate.

4. An electrostatic transducer as defined in claim 1 wherein said diaphragm and said resilient member each has substantially the same thermal expansion.

5. An electrostatic transducer comprising two plates, a first of said plates comprising a rigid, perforated, curved, conductive member having opposed convex and concave surfaces and containing a plurality of holes, each said hole tapering outwardly in a direction from said concave surface to said convex surface of said first plate, a base to which said first plate is attached adjacent the periphery of its said concave surface, a vibratory diaphragm of dielectric material extending over said convex surface of said first plate, the second of said plates comprising a coat of conductive material on the surface of said diaphragm which is remote from said convex surface, and a resilient member engaging said second plate and having a circular hole in alignment with said plates, said hole having a larger diameter than that of said first plate, said resilient member having a ridge adjacent to the circumference of said hole on its side adjacent to said second plate, means attaching said resilient member to said base in a position to tension said diaphragm and said second plate uniformly over said first plate by means of said ridge.

6. An electrostatic transducer comprising two plates, a first of said plates comprising a rigid, perforated, curved, conductive member having opposed convex and concave surfaces, a vibratory diaphragm of dielectric material extending over said convex surface of said first plate, the second of said plates comprising a coat of conductive material on the surface of said diaphragm which is remote from said convex surface, a resilient member engaging said second plate and tensioning said diaphragm and said second plate uniformly over said first plate, and means positioned between said second plate and said resilient member to prevent migration of the material of said second plate to said resilient member.

7. An electrostatic transducer as defined in claim 6 wherein said last-named means is a gasket having a hole in the center thereof, said hole having the same diameter as the hole in said resilient member.

8. An electrostatic transducer comprising two plates, a first of said plates comprising a rigid, curved, conductive member having opposed convex and concave surfaces and containing a plurality of holes, each said hole tapering outwardly in a direction from said concave surface to said convex surface of said first plate, a base to which said first plate is attached adjacent the periphery of said concave surface, a vibratory diaphragm of dielectric material extending over said convex surface of said first plate, the second of said plates comprising a coat of conductive material on the surface of said diaphragm which is remote from said convex surface, a resilient member engaging said second plate and having a circular hole in alignment with said plates, said hole having a larger diameter than that of said first plate, said resilient member having a ridge adjacent to the circumference of said hole on its side adjacent to said second plate, means attaching said resilient member to said base in a position to tension said diaphragm and said second plate uniformly over said first plate by means of said ridge, and means positioned between said second plate and said member to prevent migration of the material of said second plate to said member.

References Cited in the file of this patent

UNITED STATES PATENTS

| 1,777,170 | Kyle | Sept. 30, 1930 |
| 1,844,219 | Greaves | Feb. 9, 1932 |
| 1,859,170 | Reisz | May 17, 1932 |
| 2,910,539 | Hartsfield | Oct. 27, 1959 |

FOREIGN PATENTS

| 792,131 | Great Britain | Mar. 19, 1958 |